Patented May 8, 1928.

1,669,328

UNITED STATES PATENT OFFICE.

HAROLD WARD DUDLEY, OF LONDON, ENGLAND.

SPECIFIC ANTIDIABETIC PRINCIPLE.

No Drawing. Application filed March 20, 1924, Serial No. 700,726, and in Great Britain March 27, 1923.

The specific antidiabetic principle obtained from the pancreas and from certain other animal organs and apparently also from other material consisting of organic cells (hereinafter referred to as "the specific antidiabetic principle"), has hitherto been accompanied by or associated with other substances which it is desirable to eliminate.

The present invention relates to a process by which the specific antidiabetic principle is separated wholly or in part from the other substances which accompany it in the ordinary preparation in order that the principle can be administered therapeutically with advanced safety.

The aforesaid specific antidiabetic principle is obtained in crude form as a precipitate at the end of the sixth stage of the seven-stage process set out in U. S. Patent No. 1,469,994 of October 3, 1923, and while the term "crude principle", as used in this specification and the appended claims, is intended to mean the product which is or can be obtained from the pancreas by the first six stages of the process of the said U. S. patent, it is to be understood that I do not desire to be limited to any particular method of obtaining the crude principle, since my invention resides in the method of separation of the specific antidiabetic principle wholly or in part from other substances which accompany it in the crude principle, independently of the particular method which may be adopted for the extraction of the crude principle from the pancreas or other animal organ.

For this purpose the crude principle is treated with picric acid which forms a combination containing the specific antidiabetic principle which is insoluble in water and can be decomposed by a mineral acid to yield a soluble salt containing the principle.

For example the crude product, that is to say, the granular precipitate obtained in the final stage of the known alcohol treatment of pancreas, may be dissolved in water to form a solution of 1.5 per cent strength. To this is added about half its volume of a saturated aqueous solution of picric acid. The precipitate thus produced is suspended in absolute alcohol and an alcoholic solution of hydrochloric acid is added to convert the picrate of the specific antidiabetic principle into the hydrochloride of the latter, which is insoluble in the alcohol and may be washed with ether.

The best method of obtaining the purified product is as follows:—

The crude product is dissolved in a small amount of water, and this solution is then centrifuged to free it from the amorphous, insoluble material which is usually observed at this point. Filtration, even through paper, is apt to be attended by loss of activity. It is then diluted with water to bring the concentration slightly higher than 1.5 per cent, reckoned on the original weight of crude product taken, and the pH is adjusted to about 5, the whole being then further diluted, if necessary, to bring the concentration to 1.5 per cent.

To this solution half its volume of saturated aqueous picric acid is added. An immediate flocculent, amorphous precipitate is formed which settles rapidly to the bottom of the liquid, leaving a fine suspension in the supernatant fluid. After standing for one or two days at ordinary room temperature the supernatant liquid becomes quite clear and is poured off. A little water is then added to the precipitate which is now adhering to the bottom of the vessel. The precipitate is rubbed up with the water, and to the suspension is added, in small quantities at a time, just sufficient $N/10$ $Na_2CO_3$ solution to produce a clear yellow-brown solution. If there is any insoluble material, it should be removed by centrifugal action or filtration. This process should be carried out as quickly as possible, and it is well to prevent the temperature from exceeding 10° C. Distilled water is then added so that the solution contains 1.5–2 grams of picrate per litre.

An amount of hydrochloric acid containing HCl equivalent to the $Na_2CO_3$ used, is then added. The picrate is again precipitated, and completeness of precipitation is ensured by adding to the solution one quarter its volume of saturated aqueous picric acid. After standing until the supernatant liquid is clear the precipitate is washed by decantation, or on a Buchner funnel, with a weak aqueous solution of picric acid (containing 5 vols. saturated aqueous picric acid to each 100 vols.). After adequate washing, to remove the sodium chloride, the moist picrate is transferred to a vessel and stirred with a solution of hydrochloric acid in alcohol of 75 per cent strength, prepared by mixing 25 vols. 3N (aqueous) HCl with 75 vols. of alcohol. The picrate, after first forming thick, dark brown, oily drops, dissolves in this reagent, yielding a turbid, dark yellow liquid. It should be stirred until all the oily drops have disappeared. The amount of the alcoholic HCl solution used is not important, but from 10–15 c. c. per gram of picrate taken is an appropriate quantity. Acetone is then added until no further precipitate appears. 10 to 20 volumes of acetone per volume of the solution are necessary.

The precipitated hydrochloride is filtered on a Buchner funnel, washed with a little acetone until perfectly free from picric acid, and finally with dry ether. It is then dried in a vacuum desiccator over strong sulphuric acid. The material so obtained is a pure white powder, which dissolves in water completely, giving a colourless solution, containing no trace of picric acid.

Having thus described the nature of the said invention and the best means I know of carrying the same into practical effect, I claim:—

1. A process of purifying the specific antidiabetic principle which comprises adding picric acid to a solution of the crude principle and decomposing by a mineral acid the insoluble combination thus formed, so as to obtain a soluble salt containing the principle.

2. A process of purifying the specific antidiabetic principle which comprises dissolving the crude principle in water to form a solution of 1.5 per cent strength, adding to the solution about half its volume of a saturated aqueous solution of picric acid, and treating the precipitate thus produced with a mineral acid.

3. A process of purifying the specific antidiabetic principle which comprises dissolving the crude principle in water to form a solution of 1.5 per cent strength, adding to the solution about half its volume of a saturated aqueous solution of picric acid, dissolving the precipitate thus produced in an alcoholic solution of hydrochloric acid, adding acetone to the solution so obtained to precipitate the hydrochloride of the specific antidiabetic principle therefrom, and separating the precipitate.

4. A process of purifying the specific antidiabetic principle which comprises dissolving the crude principle in water to form a solution of 1.5 per cent strength, adding to the solution about half its volume of a saturated aqueous solution of picric acid, dissolving the precipitate in a solution of an alkali carbonate, adding to the solution an acid in quantity chemically equivalent to the alkali carbonate contained in the solution, separating the precipitate, stirring the precipitate with an alcoholic solution of hydrochloric acid until dissolution is complete, adding acetone to the solution so produced, and separating the hydrochloride of the specific antidiabetic principle thus precipitated.

In testimony whereof I have signed my name to this specification.

HAROLD WARD DUDLEY.